(12) United States Patent
Que et al.

(10) Patent No.: US 11,432,252 B2
(45) Date of Patent: Aug. 30, 2022

(54) LOCAL POSITIONING SYSTEM SYNCHRONIZATION USING ONE AND TWO-WAY ARTIFICIAL DELAY COMPENSATION

(71) Applicant: Airbus Defence and Space GmbH, Taufkirchen (DE)

(72) Inventors: Russel Que, Hoehenkirchen-Siegertsbrunn (DE); Klaus Kittmann, Kirchseeon (DE); Michael Von Voithenberg, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 177 days.

(21) Appl. No.: 16/758,507

(22) PCT Filed: Oct. 26, 2018

(86) PCT No.: PCT/EP2018/079377
§ 371 (c)(1),
(2) Date: May 11, 2020

(87) PCT Pub. No.: WO2019/081694
PCT Pub. Date: May 2, 2019

(65) Prior Publication Data
US 2021/0329572 A1    Oct. 21, 2021

(30) Foreign Application Priority Data

Oct. 27, 2017 (EP) .................................. 17198906

(51) Int. Cl.
*H04W 56/00* (2009.01)
*G01S 5/02* (2010.01)
*G01S 5/14* (2006.01)

(52) U.S. Cl.
CPC ......... *H04W 56/001* (2013.01); *G01S 5/0284* (2013.01); *G01S 5/14* (2013.01)

(58) Field of Classification Search
CPC ....... H04W 56/001; G01S 5/0284; G01S 5/14
See application file for complete search history.

(56) References Cited

U.S. PATENT DOCUMENTS

| 10,382,094 B2 * | 8/2019 | Buehrer ................ G01S 13/00 |
| 2003/0020598 A1 * | 1/2003 | Albert ................ G06K 7/0008 340/10.51 |

(Continued)

FOREIGN PATENT DOCUMENTS

EP      1454163 B1 *  5/2012  ............. G01S 13/84

OTHER PUBLICATIONS

European Search Report; priority document.
International Search Report; priority document.

*Primary Examiner* — Khai M Nguyen
(74) *Attorney, Agent, or Firm* — Greer, Burns & Crain, Ltd.

(57) ABSTRACT

A system for synchronizing transceivers which includes a first and second plurality of transceivers. The first plurality of transceivers are arranged at fixed positions with respect to each other. One of the first plurality of transceivers is configured to transmit a first wideband signal. The second plurality of transceivers are arranged at fixed positions with respect to each other. Each of the second plurality of transceivers is configured to receive the first wideband signal and to generate a respective one of second wideband signals based on the respectively received first wideband signal modified by a respective one of offsets which differ from each other, and to transmit the respective one of second wideband signals. The one of the first plurality of transceivers is configured to receive the second wideband signals (Continued)

which form the basis for synchronizing one of the first plurality of transceivers with the second plurality of transceivers.

15 Claims, 11 Drawing Sheets

(56) References Cited

U.S. PATENT DOCUMENTS

| | | | |
|---|---|---|---|
| 2006/0291537 A1* | 12/2006 | Fullerton | G01S 7/4052 375/145 |
| 2011/0149779 A1* | 6/2011 | Richards | G01S 7/006 370/252 |
| 2012/0044104 A1* | 2/2012 | Schloetzer | G01S 5/0263 342/357.29 |
| 2012/0162014 A1 | 6/2012 | Wu et al. | |
| 2012/0326923 A1* | 12/2012 | Oehler | G01S 5/14 342/464 |

* cited by examiner

US 11,432,252 B2

LOCAL POSITIONING SYSTEM SYNCHRONIZATION USING ONE AND TWO-WAY ARTIFICIAL DELAY COMPENSATION

CROSS-REFERENCES TO RELATED APPLICATIONS

This application claims the benefit of the International Application No. PCT/EP2018/079377, filed on Oct. 26, 2018, and of the French patent application No. 17198906.4 filed on Oct. 27, 2017, the entire disclosures of which are incorporated herein by way of reference.

FIELD OF THE INVENTION

Examples relate to concepts for synchronizing transceivers and applications thereof and, in particular, to a system for synchronizing transceivers.

BACKGROUND OF THE INVENTION

Systems for synchronizing transceivers may have to be optimized with respect to measurement accuracy. Nevertheless, it is desired to form a system to determine more accurately distances between different transceivers.

There may be a demand to provide concepts for positioning systems aside from GNSS positioning systems.

Such a demand may be satisfied by the subject-matter of the claims.

SUMMARY OF THE INVENTION

According to a first aspect, a system for synchronizing transceivers is provided. The system comprises a first plurality of transceivers. The system comprises a second plurality of transceivers. The transceivers of the first plurality of transceivers are arranged at fixed positions with respect to each other. One of the first plurality of transceivers is adapted to transmit a first wideband signal. The transceivers of the second plurality of transceivers are arranged at fixed positions with respect to each other. Each of the second plurality of transceivers is adapted to respectively receive the first wideband signal. Each of the second plurality of transceivers is adapted to generate a respective one of second wideband signals based on the respectively received first wideband signal modified by a respective one of offsets. The offsets differ from each other. Each of the second plurality of transceivers is adapted to transmit the respective one of second wideband signals. The one of the first plurality of transceivers is adapted to receive the second wideband signals which form the basis for synchronizing the one of the first plurality of transceivers with the second plurality of transceivers.

The one of the first plurality of transceivers may be adapted to synchronize (at least the one of) the first plurality of transceivers based on the second wideband signals. In other words, the one of the first plurality of transceivers may be adapted to synchronize (at least the one of) the first plurality of transceivers with the second plurality of transceivers based on the second wideband signals.

In line with the first aspect, a system for synchronizing transceivers is provided. The system comprises a first plurality of transceivers. The system comprises a second plurality of transceivers. The transceivers of the first plurality of transceivers are arranged at fixed positions with respect to each other. One of the first plurality of transceivers is adapted to transmit a first wideband signal. The transceivers of the second plurality of transceivers are arranged at fixed positions with respect to each other. Each of the second plurality of transceivers is adapted to respectively receive the first wideband signal. Each of the second plurality of transceivers is adapted to generate a respective one of second wideband signals based on the respectively received first wideband signal modified by a respective one of offsets. The offsets differ from each other. Each of the second plurality of transceivers is adapted to transmit the respective one of second wideband signals. The one of the first plurality of transceivers is adapted to receive the second wideband signals and to synchronize the first plurality of transceivers based on the second wideband signals.

The term "modified by a respective one of offsets" can mean "shifted by a respective one of frequency offsets". The term "modified by a respective one of offsets" can also mean "delayed by a respective one of (second) time delays". Thereby, the offsets can be understood as the (second) time delays. Thereby, the offsets can be the frequency offsets. The offsets can be arbitrarily set.

The one of the first plurality of transceivers can be adapted to transmit the first wideband signal during a first time slot. The one of the first plurality of transceivers can be adapted to receive the second wideband signals during the first time slot.

Another one of the first plurality of transceivers can be adapted to transmit another first wideband signal during a subsequent time slot. Each of the second plurality of transceivers can be adapted to respectively receive the other first wideband signal during the subsequent time slot. Each of the second plurality of transceivers can be adapted to generate, during the subsequent time slot, a respective one of other second wideband signals based on the respectively received other first wideband signal modified by a respective one of other offsets. The other offsets may differ from each other. Each of the second plurality of transceivers can be adapted to transmit the respective one of other second wideband signals during the subsequent time slot. The other one of the first plurality of transceivers can be adapted to receive the other second wideband signals and to synchronize the first plurality of transceivers (with the second plurality of transceivers) based on the other second wideband signals (and the second wideband signals), during the subsequent time slot.

Each one of the second wideband signals can be offset by frequency, such that the second wideband signals can be aggregated in exactly one wideband frequency band. The aggregated frequency band can comprise each of the second wideband signals. Further, each one of the second wideband signals can be delayed in time, such that they are transmitted subsequently in time. The subsequence can be based on the offsets.

The one of the first plurality of transceivers can be adapted to transmit the first wideband signal on a first frequency slot (during a first time slot). The one of the first plurality of transceivers can be adapted to receive the second wideband signals on the first frequency slot (during the first time slot).

Another one of the first plurality of transceivers can be adapted to transmit another first wideband signal on a second frequency slot (during the first time slot). Each of the second plurality of transceivers can be adapted to respectively receive the other first wideband signal on the second frequency slot (during the first time slot). Each of the second plurality of transceivers can be adapted to generate a respective one of other second wideband signals based on the respectively received other first wideband signal modified by a respective one of other offsets. The other offsets may differ from each other. Each of the second plurality of transceivers can be adapted to transmit the respective one of other second wideband signals on the second frequency slot (during the first time slot). The other one of the first plurality of transceivers can be adapted to receive, on the second frequency slot (during the first time slot), the other second wideband signals and to synchronize the first plurality of transceivers (with the second plurality of transceivers) based on the other second wideband signals (and the second wideband signals).

The offsets can be arbitrarily set. The other offsets can also be arbitrarily set. The other offsets can be the same or differ from the offsets.

The first wideband signal can have the form of a triangle wave. Each of the second wideband signals can have the form of a triangle wave. The triangle wave can be understood as a wave having a triangular chirp modulation. The term "triangle" can refer to a triangular shape of a frequency profile (not an amplitude profile) of the corresponding wideband signal.

Before transmitting the first wideband signal, the one of the first plurality of transceivers may be adapted to transmit a sync signal under use of control bits. Each of the second plurality of transceivers may be adapted to receive the sync signal. Each of the second plurality of transceivers may be adapted to extract information regarding a waveform slope and/or a sweep time of the first wideband signal based on the control bits. The second wideband signals may at least partly be based on the waveform slope and/or the sweep time.

The one of the first plurality of transceivers can be adapted to measure respective distances between each of the second plurality of transceivers and the one of the first plurality of transceivers.

The other one of the first plurality of transceivers can be adapted to measure respective distances between each of the second plurality of transceivers and the other one of the first plurality of transceivers.

The one of the first plurality of transceivers can be adapted to broadcast the measured respective distances to the other ones of the first plurality of transceivers. The other ones of the first plurality of transceivers can be adapted to compute their respective distances to each of the second plurality of transceivers based on the measured respective distances.

The other one of the first plurality of transceivers can be adapted to broadcast the measured respective distances to the different ones of the first plurality of transceivers. The different ones of the first plurality of transceivers can be adapted to compute their respective distances to each of the second plurality of transceivers based on the measured respective distances.

The system can further comprise a first moving vehicle. The first plurality of transceivers can be mounted on the first moving vehicle. The system can further comprise a second moving vehicle. The second plurality of transceivers can be mounted on the second moving vehicle.

Respective pairs of transceivers of the first plurality of transceivers can be less than 1 meter (or 2 meter or 3 meter or 4 meter) apart. Respective pairs of transceivers of the second plurality of transceivers can be more than 1 meter (or 2 meter or 3 meter or 5 meter or 10 meter) apart.

For example, the first plurality of transceivers can be mounted on an unmanned vehicle. Thus, respective pairs of transceivers of the first plurality of transceivers can be less than 1 m (or 50 cm or 25 cm apart). Further, the second plurality of transceivers can be mounted on a ship, runway or helipad. Thus, respective pairs of transceivers of the second plurality of transceivers can be more than 1 meter (or 2 meter or 3 meter or 5 meter or 10 meter) apart. This may lead to a better accuracy in determining an actual 3D position.

The first plurality of transceivers can be arranged to form a first area. The second plurality of transceivers can be arranged to form a second area. The first area can differ from the second area. The first area can be a plane. The second area can be a plane. The first and second planes can be moving relative to each other during an operation of the system.

The one of the first plurality of transceivers may be adapted to send a coarse synchronization signal before each of the second plurality of transceivers receives the first wideband signal. The coarse synchronization signal can inform each of the second plurality of transceivers that a transmittal of the first wideband signal starts.

The other one of the first plurality of transceivers may be adapted to send another coarse synchronization signal before each of the second plurality of transceivers receives the other first wideband signal. The other coarse synchronization signal can inform each of the second plurality of transceivers that a transmittal of the other first wideband signal starts.

The transmittal of the first wideband signal can start after an end of the coarse synchronization signal. A first time delay can exist between the end of the coarse synchronization signal and a beginning of the first wideband signal.

The transmittal of the other first wideband signal can start after an end of the other coarse synchronization signal. Another first time delay can exist between the end of the other coarse synchronization signal and a beginning of the other first wideband signal.

The first time delay can be arbitrarily set. The first time delay can differ from each of the offsets. The offsets can be the second time delays. The first time delay can be shorter than each of the second time delays. The other offsets can be the second time delays. The other first time delay can differ from each of the second time delays. The other first time delay can be shorter than each of the second time delays.

Each of the second plurality of transceivers can be adapted to start the respective one of offsets, after each of the second plurality of transceivers determined the end of the received coarse synchronization signal.

Each of the second plurality of transceivers can be adapted to start the respective one of other offsets, after each of the second plurality of transceivers determined the end of the received other coarse synchronization signal.

Each of the second plurality of transceivers can be adapted to transmit information on the respective one of offsets to the one of the first plurality of transceivers via a data link, after transmitting the respective one of second wideband signals.

Each of the second plurality of transceivers can be adapted to transmit information on the respective one of other offsets to the one of the first plurality of transceivers via a data link, after transmitting the respective one of other second wideband signals.

Each of the second plurality of transceivers can be adapted to compare the respectively received first wideband signal with a signal corresponding to the transmitted first wideband signal. The respective comparison results can comprise a frequency offset, a beat frequency and a delay time interval between receiving the first wideband signal and transmitting the respective one of the second wideband signals. The results can be transmitted via the data link to the one of the first plurality of transceivers.

Each of the second plurality of transceivers can be adapted to compare the respectively received other first wideband signal with a signal corresponding to the transmitted other first wideband signal. The respective comparison results can comprise another frequency offset, another beat frequency and another delay time interval between receiving the other first wideband signal and transmitting the respective one of the other second wideband signals. The results can be transmitted via the data link to the other one of the first plurality of transceivers.

According to a second aspect, a method for synchronizing transceivers is provided. The method comprises transmitting a first wideband signal by one of a first plurality of transceivers. The method further comprises respectively receiving the first wideband signal by each of a second plurality of transceivers. The method further comprises generating, by each of the second plurality of transceivers, a respective one of second wideband signals based on the respectively received first wideband signal modified by a respective one of offsets. The offsets differ from each other. The method further comprises transmitting the respective one of second wideband signals by each of the second plurality of transceivers. The method further comprises receiving the second wideband signals by the one of the first plurality of transceivers. The method further comprises synchronizing (at least the one of the) the first plurality of transceivers (with the second plurality of transceivers) based on the second wideband signals (by the one of the first plurality of transceivers).

For example, the second wideband signals may form the basis for synchronizing the one of the first plurality of transceivers with the second plurality of transceivers.

In line with the second aspect, a method for synchronizing transceivers is provided. The method comprises transmitting a first wideband signal by one of a first plurality of transceivers. The method further comprises respectively receiving the first wideband signal by each of a second plurality of transceivers. The method further comprises generating, by each of the second plurality of transceivers, a respective one of second wideband signals based on the respectively received first wideband signal modified by a respective one of offsets. The offsets differ from each other. The method further comprises transmitting the respective one of second wideband signals by each of the second plurality of transceivers. The method further comprises receiving the second wideband signals by the one of the first plurality of transceivers. The second wideband signals form the basis for synchronizing (at least the one of the) the first plurality of transceivers with the second plurality of transceivers.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, each of the first and second plurality of transceivers may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable system, device, a computer processor or a memory connected to a processor, wherein the memory can be provided with one or more programs that perform the method, when executed by the processor. Therefore, methods like swapping and paging can be deployed.

Even if some of the aspects described above have been described in reference to the method, these aspects may also apply to system. Likewise, the aspects described above in relation to the system may be applicable in a corresponding manner to the method.

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too far nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g., "comprising" "including" or "having" etc., mean the presence of the described features, numbers, operations, acts, components, parts, or combinations thereof, and do not exclude the presence or possible addition of one or more further features, numbers, operations, acts, components, parts or their combinations.

Although terms like "first" or "second", etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

Figure 1:
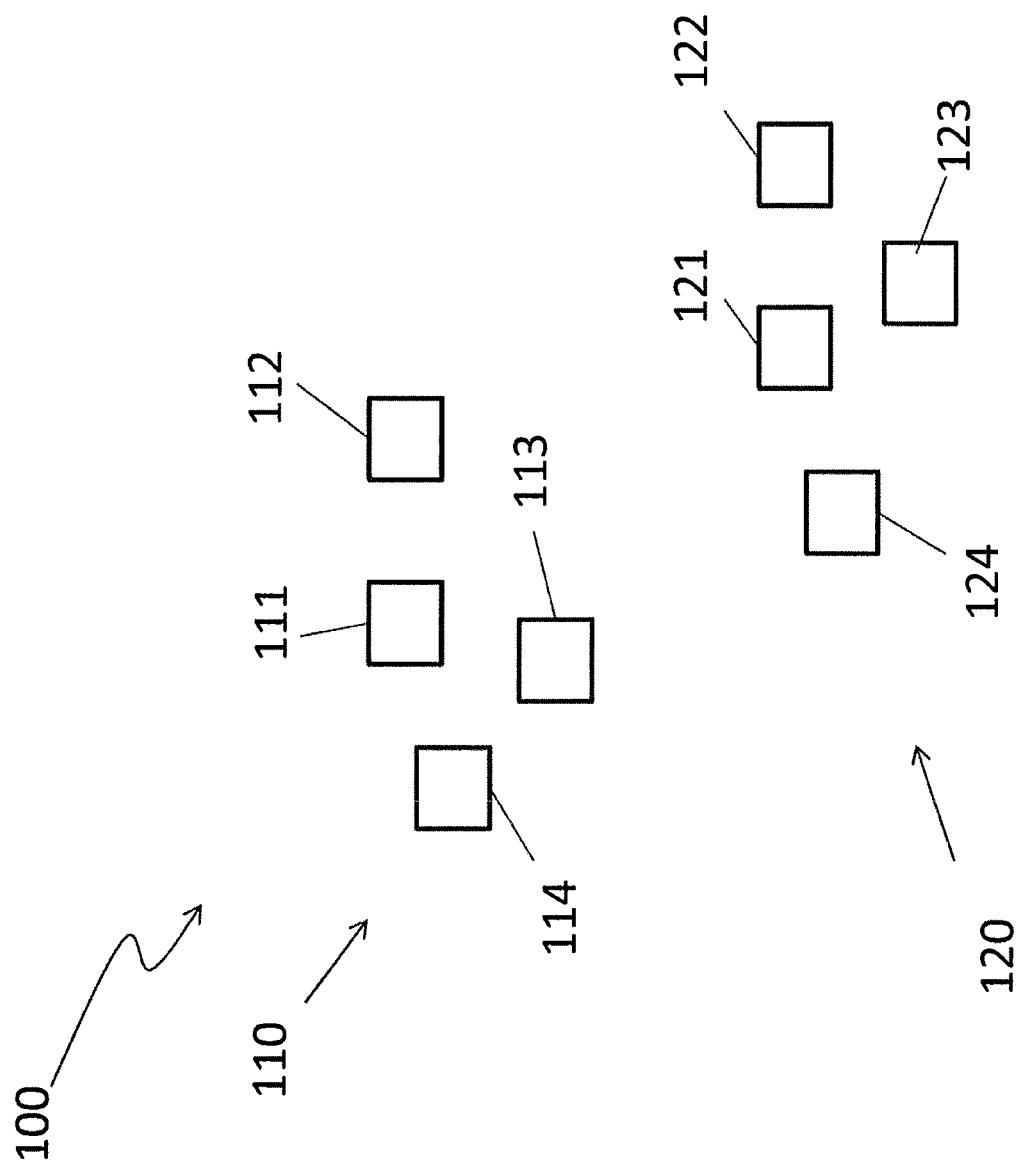
FIG. 1 schematically illustrates a system for synchronizing transceivers.

The variants of the functional and operational aspects as well as their functional and operational aspects described herein are only for a better understanding of its structure, its functions and properties; they do not limit the disclosure to the embodiments. The figures are partially schematic, the essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The system and method will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

FIG. 1 schematically illustrates a system 100 for synchronizing transceivers. The system 100 for synchronizing transceivers is provided. The system 100 comprises a first plurality of transceivers 110. The system 100 comprises a second plurality of transceivers 120. The transceivers of the first plurality of transceivers 110 are arranged at fixed positions with respect to each other. One of the first plurality of transceivers 110 is adapted to transmit a first wideband signal. The transceivers of the second plurality of transceivers 120 are arranged at fixed positions with respect to each other. Each of the second plurality of transceivers 120 is adapted to respectively receive the first wideband signal.

Each of the second plurality of transceivers 120 is adapted to generate a respective one of second wideband signals based on the respectively received first wideband signal modified by a respective one of offsets. The offsets differ from each other. Each of the second plurality of transceivers 120 is adapted to transmit the respective one of second wideband signals. The one of the first plurality of transceivers 110 is adapted to receive the second wideband signals which form the basis for synchronizing (at least) the one of the first plurality of transceivers 110 with the second plurality of transceivers 120.

The one of the first plurality of transceivers may be adapted to synchronize (at least the one of the) first plurality of transceivers with the second plurality of transceivers based on the second wideband signals.

The term "modified by a respective one of offsets" can mean "shifted by a respective one of frequency offsets". The term "modified by a respective one of offsets" can also mean "delayed by a respective one of (second) time delays". Thereby, the offsets can be understood as the (second) time delays. Thereby, the offsets can be the frequency offsets. The offsets can be arbitrarily set.

The one of the first plurality of transceivers 110 can be adapted to transmit the first wideband signal during a first time slot. The one of the first plurality of transceivers 110 can be adapted to receive the second wideband signals during the first time slot.

Another one of the first plurality of transceivers 110 can be adapted to transmit another first wideband signal during a subsequent time slot. Each of the second plurality of transceivers 120 can be adapted to respectively receive the other first wideband signal during the subsequent time slot. Each of the second plurality of transceivers 120 can be adapted to generate, during the subsequent time slot, a respective one of other second wideband signals based on the respectively received other first wideband signal modified by a respective one of other offsets. The other offsets may differ from each other. Each of the second plurality of transceivers 120 can be adapted to transmit the respective one of other second wideband signals during the subsequent time slot. The other one of the first plurality of transceivers 110 can be adapted to receive the other second wideband signals and to synchronize the first plurality of transceivers 110 (with the second plurality of transceivers 120) based on the other second wideband signals (and the second wideband signals), during the subsequent time slot.

Each one of the second wideband signals can be offset by frequency, such that the second wideband signals can be aggregated in exactly one wideband frequency band. The aggregated frequency band can comprise each of the second wideband signals. Further, each one of the second wideband signals can be delayed in time, such that they are transmitted subsequently in time. The subsequence can be based on the offsets.

The one of the first plurality of transceivers 110 can be adapted to transmit the first wideband signal on a first frequency slot (during a first time slot). The one of the first plurality of transceivers 110 can be adapted to receive the second wideband signals on the first frequency slot (during the first time slot).

Another one of the first plurality of transceivers 110 can be adapted to transmit another first wideband signal on a second frequency slot (during the first time slot). Each of the second plurality of transceivers 120 can be adapted to respectively receive the other first wideband signal on the second frequency slot (during the first time slot). Each of the second plurality of transceivers 120 can be adapted to generate a respective one of other second wideband signals based on the respectively received other first wideband signal modified by a respective one of other offsets. The other offsets may differ from each other. Each of the second plurality of transceivers 120 can be adapted to transmit the respective one of other second wideband signals on the second frequency slot (during the first time slot). The other one of the first plurality of transceivers 110 can be adapted to receive, on the second frequency slot (during the first time slot), the other second wideband signals and to synchronize the first plurality of transceivers 110 (with the second plurality of transceivers 120) based on the other second wideband signals (and the second wideband signals).

The (other) offsets can be arbitrarily set. The (other) offsets can be the same or differ from the offsets.

The first wideband signal can have the form of a triangle wave. Each of the second wideband signals can have the form of a triangle wave.

The (other) one of the first plurality of transceivers 110 can be adapted to measure respective distances between each of the second plurality of transceivers 120 and the (other) one of the first plurality of transceivers 110.

The (other) one of the first plurality of transceivers 110 can be adapted to broadcast the measured respective distances to the other (different) ones of the first plurality of transceivers 110. The other (different) ones of the first plurality of transceivers 110 can be adapted to compute their respective distances to each of the second plurality of transceivers 120 based on the measured respective distances.

The system 100 can further comprise a first moving vehicle. The first plurality of transceivers 110 can be mounted on the first moving vehicle. The system 100 can further comprise a second moving vehicle. The second plurality of transceivers 120 can be mounted on the second moving vehicle.

Respective pairs of transceivers of the first plurality of transceivers 110 can be less than 1 meter (or 2 meter or 3 meter or 4 meter) apart. Respective pairs of transceivers of the second plurality of transceivers 120 can be more than 1 meter (or 2 meter or 3 meter or 5 meter or 10 meter) apart. For example, the first plurality of transceivers can be mounted on an unmanned vehicle. Thus, respective pairs of transceivers of the first plurality of transceivers can be less than 1 m (or 50 cm or 25 cm apart). Further, the second plurality of transceivers can be mounted on a ship, runway or helipad. Thus, respective pairs of transceivers of the second plurality of transceivers can be more than 1 meter (or 2 meter or 3 meter or 5 meter or 10 meter) apart. This may lead to a better accuracy in determining an actual 3D position.

For example, if several sensors/trx are mounted looking outward from different sides of the vehicle, it is still guaranteed to still see respective ones of the second plurality of transceivers 120 even under extreme attitude fluctuations. The second plurality of transceivers 120 on the other hand may be designed to be as far apart as possible in any application (ship, runway or helipad) in order to get more accuracy from the multilateration algorithm in determining the actual 3D position.

The first plurality of transceivers 110 can be arranged to form a first area. The second plurality of transceivers 120 can be arranged to form a second area. The first area can differ from the second area. The first area can be a plane. The second area can be a plane. The first and second planes can be moving relatively to each other during an operation of the system 100.

The (other) one of the first plurality of transceivers 110 may be adapted to send a (another) coarse synchronization signal before each of the second plurality of transceivers 120 receives the (other) first wideband signal. The (other) coarse synchronization signal can inform each of the second plurality of transceivers 120 that a transmittal of the (other) first wideband signal starts.

The transmittal of the (other) first wideband signal can start after an end of the (other) coarse synchronization signal. A (another) first time delay can exist between the end of the (other) coarse synchronization signal and a beginning of the (other) first wideband signal.

The first time delay can be arbitrarily set. The (other) offsets can be the second time delays. The (other) first time delay can differ from each of the second time delays. The (other) first time delay can be shorter than each of the second time delays.

Each of the second plurality of transceivers 120 can be adapted to start the respective one of (other) offsets, after each of the second plurality of transceivers 120 determined the end of the received (other) coarse synchronization signal.

Each of the second plurality of transceivers 120 can be adapted to transmit information on the respective one of (other) offsets to the one of the first plurality of transceivers 110 via a data link, after transmitting the respective one of (other) second wideband signals.

Each of the second plurality of transceivers 120 can be adapted to compare the respectively received (other) first wideband signal with a signal corresponding to the transmitted (other) first wideband signal. The respective comparison results can comprise a (another) frequency offset, a (another) beat frequency and a (another) delay time interval between receiving the (other) first wideband signal and transmitting the respective one of the (other) second wideband signals. The results can be transmitted via the data link to the (other) one of the first plurality of transceivers 110.

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g., FIGS. 2 to 11).

Figure 2:
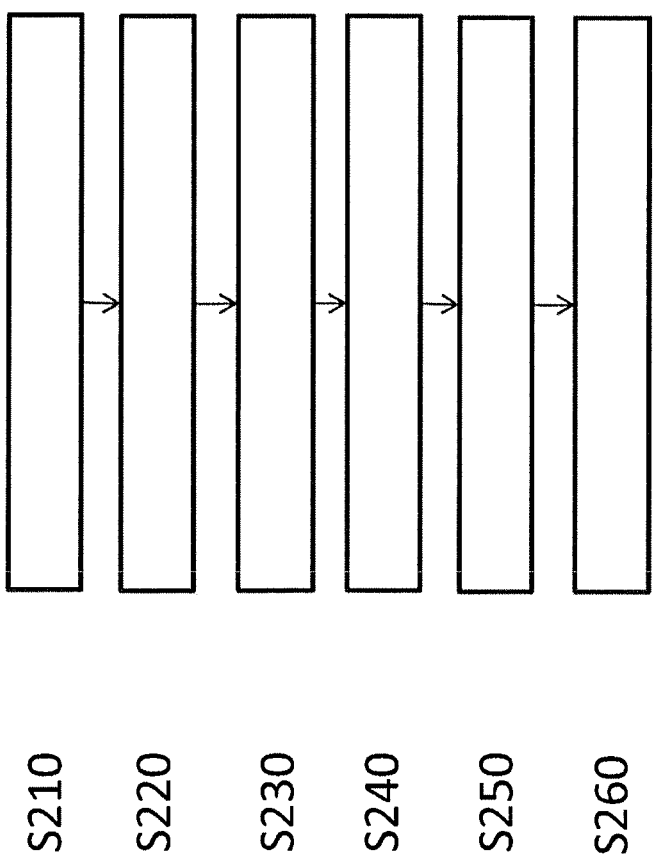
FIG. 2 schematically illustrates a method for synchronizing transceivers.

FIG. 2 schematically illustrates a method for synchronizing transceivers. The method comprises transmitting S210 a first wideband signal by one of a first plurality of transceivers. The method further comprises respectively receiving S220 the first wideband signal by each of a second plurality of transceivers. The method further comprises generating S230, by each of the second plurality of transceivers, a respective one of second wideband signals based on the respectively received first wideband signal modified by a respective one of offsets. The offsets differ from each other. The method further comprises transmitting S240 the respective one of second wideband signals by each of the second plurality of transceivers. The method further comprises receiving S250 the second wideband signals by the one of the first plurality of transceivers. The method further comprises synchronizing S260 (at least the one of the) first plurality of transceivers (with the second plurality of transceivers) based on the second wideband signals (by the one of the first plurality of transceivers). For example, the second wideband signals may form the basis for synchronizing the one of the first plurality of transceivers 110 with the second plurality of transceivers 120.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g., FIG. 1) or below (e.g., FIGS. 3 to 11).

Figure 3:
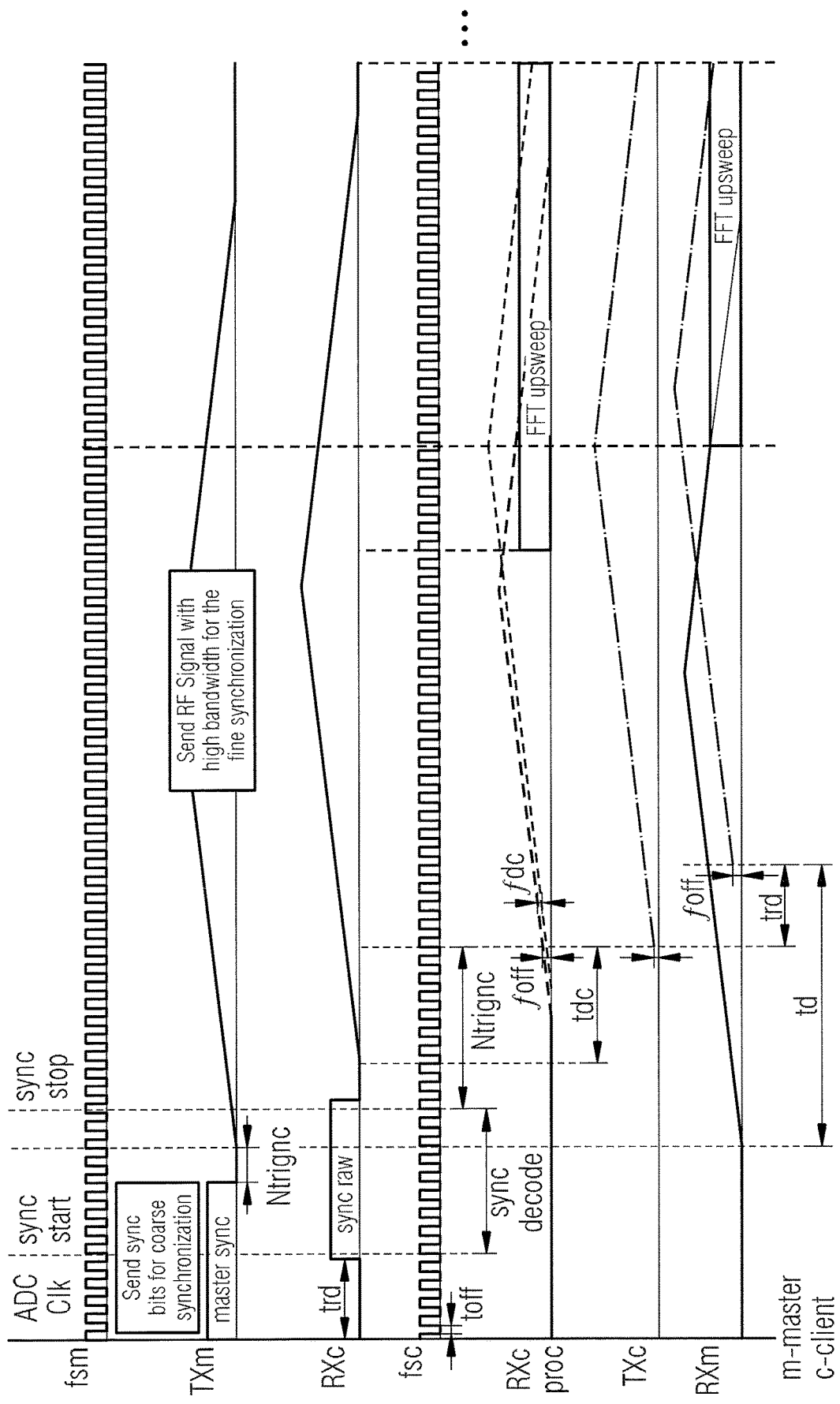
FIG. 3 schematically illustrates a first part of a time diagram.
Figure 4:
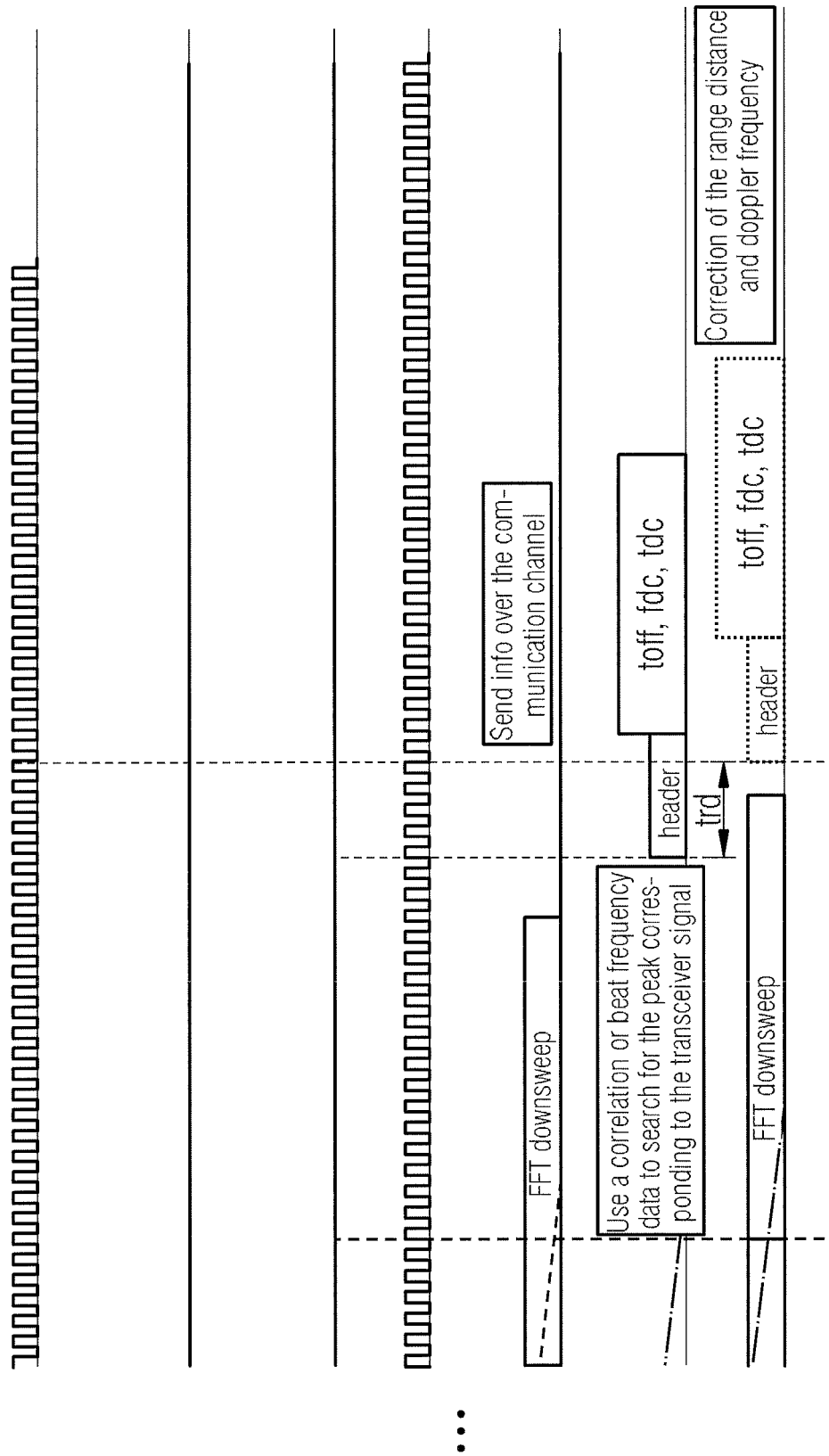
FIG. 4 schematically illustrates a second part of the time diagram.

FIG. 3 schematically illustrates a first part of a time (timing) diagram. The second part is shown in FIG. 4. At least one (also referred to as master (transceiver)) of a first plurality of transceivers sends sync bits for a coarse synchronization. After at least one (also referred to as client (transceiver)) of a second plurality of transceivers has recognized that the master is going to send a wideband signal. The wideband signal has a high bandwidth and is considered for fine synchronization. The coarse synchronization signal is considered for coarse synchronization. As wideband signal a triangle wave is used in order to discriminate Doppler and distance. In the client, the wideband signal shape may be a priori known and compared with the received wideband signal of the master. It is possible for the master to use different waveform slopes, and the master can inform, on the fly, through some control bits in the sync signal, what type of waveform and/or how long the sweep time etc. Hence the clients can adopt to the type of wideband signal being requested by the master. Thus, a measurement of frequency offset, Doppler and time delay is possible within the client. The shown FFT upsweep is used to calculate parameters during the synchronization phase. The illustrated three black dots on the right hand side of the figure should indicate a transition to FIG. 4.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g., FIGS. 1 to 2) or below (e.g., FIGS. 4 to 11).

FIG. 4 schematically illustrates a second part of the time diagram. The illustrated three black dots on the left hand side of the figure should indicate the transition from FIG. 3. The FFT upsweep in FIG. 3 just ends with the beginning of the FFT downsweep, which correlate with the signal form of a triangle wave. After the delayed master wideband signal has been transmitted back from the client to the master, a correlation or beat frequency data is used to search for a peak corresponding to the master wideband signal. After these processing steps, information on the frequency offset, Doppler frequency and time delay is transmitted over a communication channel. At master level, this is used to correct range distances between master and client(s).

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g., FIGS. 1 to 3) or below (e.g., FIGS. 5 to 11).

Figure 5:
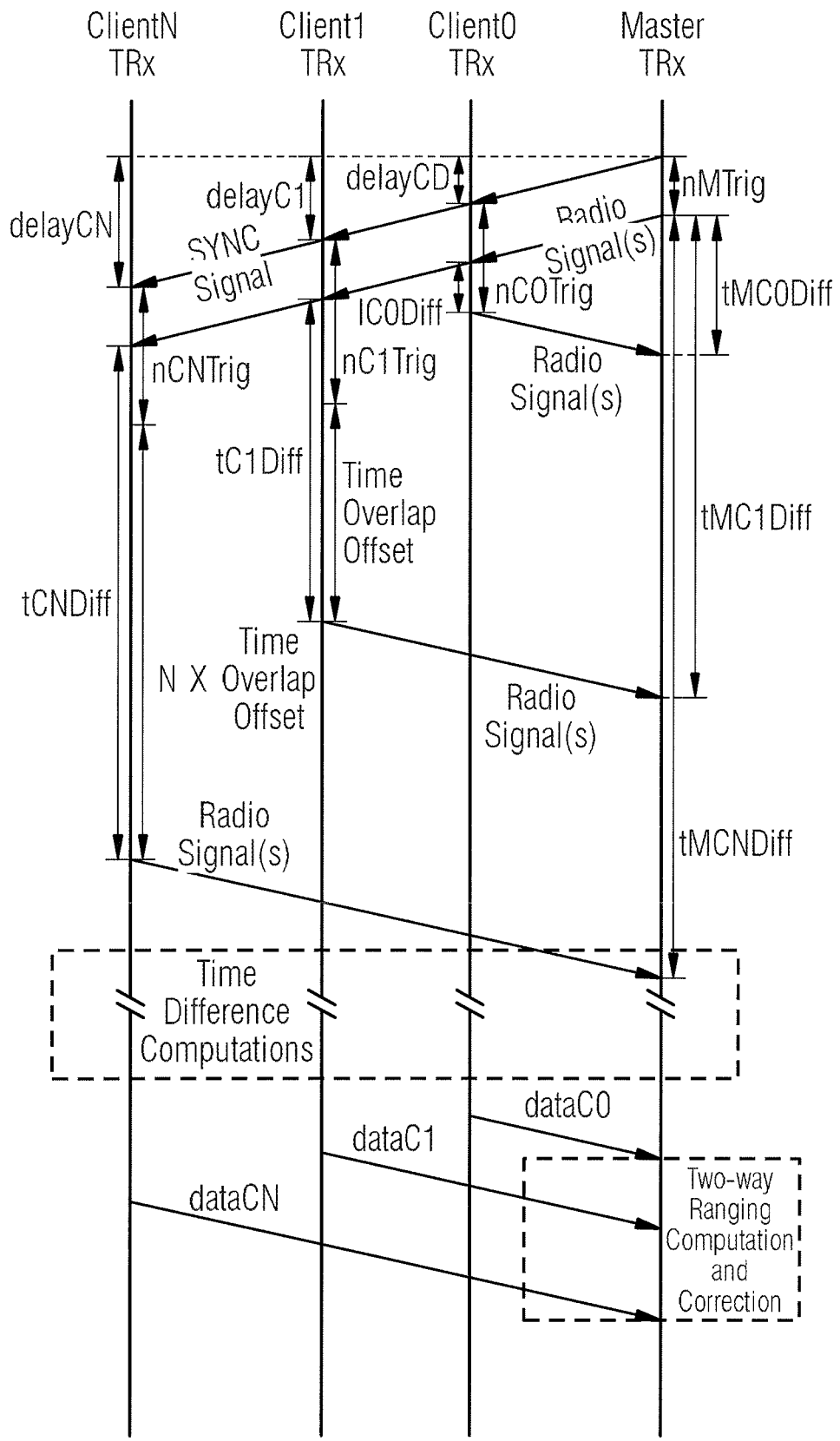
FIG. 5 schematically illustrates a signal flow graph.

FIG. 5 schematically illustrates a signal flow graph. The time runs from left to right. The upper horizontal black line illustrates time variation from the perspective of the master. The three horizontal black lines below illustrate time variation from respective perspectives of the clients. When the master transmits a sync signal, the sync signal experiences a respective delay until it arrives at the respective client (delayC0, delayC1, . . . , and delayCN). Between sync signal and transmitting radio (wideband) signal, an arbitrary time delay is set. It can also be referred to, a Trigger nMTrig sets the start of the wideband signal to be transmitted upon the trigger. After the respective time delay (delayC0, delayC1 and delayCN), the respective client artificially delays the time before transmitting a wideband signal back to the master. These artificial time delays are known for each time slot and can vary with each time slot. After each of the clients transmitted the wideband signal overlapped by a respective time overlap offset back to the master, the used time differences are computed. Even afterward the data (dataC0, dataC1, . . . , and dataCN) is transmitted to the master from every client, which is then to use this data together with the used time differences in order to perform two-way ranging computation and correction.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g., FIGS. 1 to 4) or below (e.g., FIGS. 6 to 11).

Figure 6:
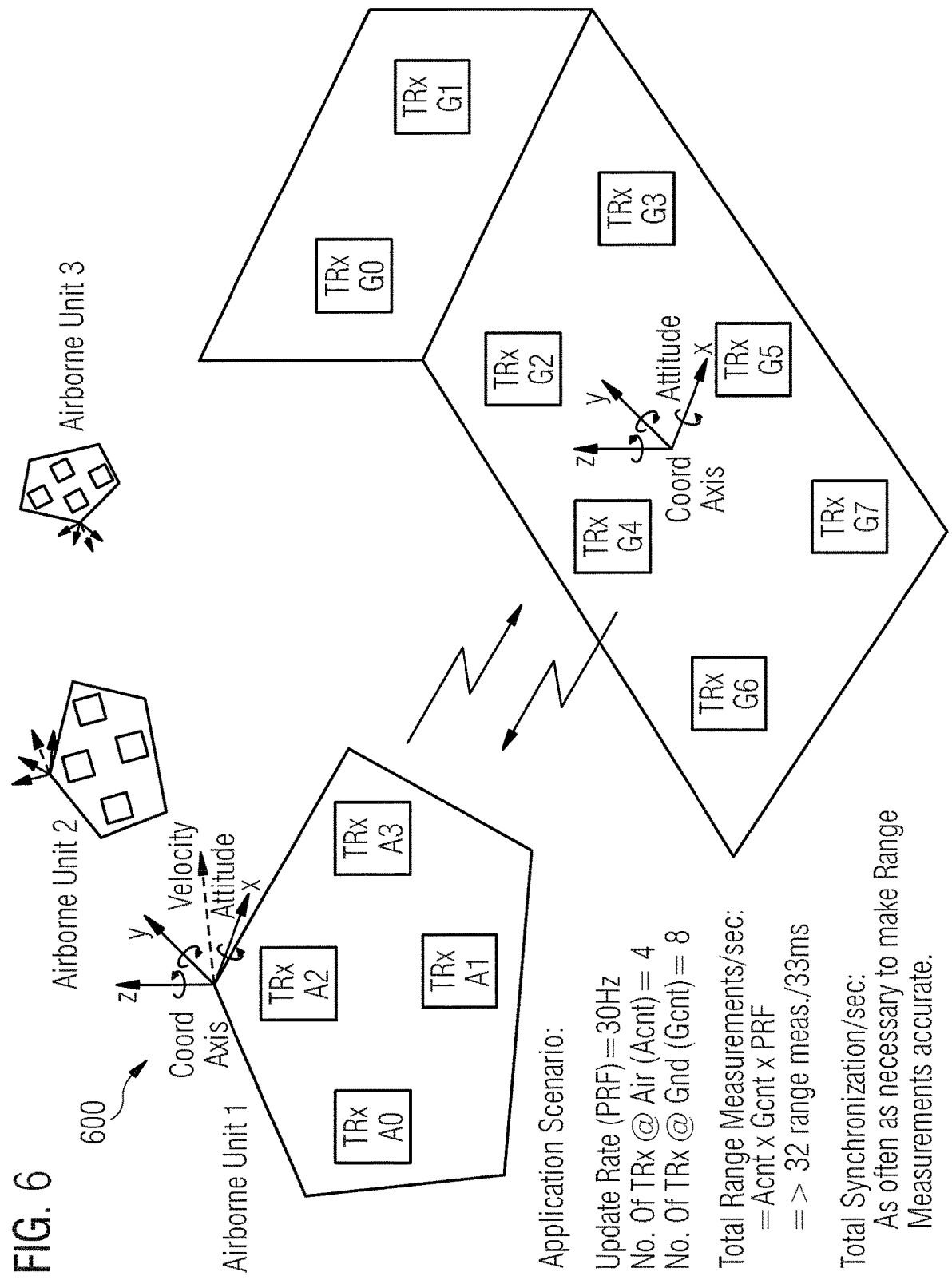
FIG. 6 schematically illustrates a system for synchronizing transceiver with different pluralities of transceivers on respective airborne units.

FIG. 6 schematically illustrates a system 600 for synchronizing transceiver with different pluralities of transceivers on respective airborne units. There are shown three different first pluralities of transceivers on respective airborne platforms (airborne units 1, 2 and 3, wherein airborne unit 1 has TRx A0, TRx A1, TRx A2 and TRx A3). Further, there is shown a second plurality of transceivers on another platform (TRx G0, TRx G1, TRx G2, TRx G3, TRx G4, TRx G5, TRx G6 and TRx G7). However, the first plurality of transceivers can be the transceivers on the other platform (TRx G0, TRx G1, TRx G2, TRx G3, TRx G4, TRx G5, TRx G6 and TRx G7) and there could be three different second pluralities of transceivers on respective airborne platforms (airborne units 1, 2 and 3, wherein airborne unit 1 has TRx A0, TRx A1, TRx A2 and TRx A3). Thus, the master could be positioned on the airborne platform or on the other platform, for example a moving vehicle or ship.

For example, in order for multiple moving platforms in any coordinate space (air, ground, etc.) to know their position relative to the coordinates of the second plurality of TRx (TRx G0-G7), the normal operation of one master syncing with the ground TRxs at any given time slot may be extended to an operation mode where one ground beacon (TRx G0) may switch to master mode and queries for their reply signals (TRx G1-G7) overlapping in the same time slots yet with different trigger offsets either in time or frequency. For example, the TRx G0 can compute its relative distances to each ground TRx, leading to an array of measured distances. Further, the TRx G0 may also know a-priori its true distances due to a fixed installation of TRx G0 to G7. By knowing the measured distances, true distances, ground coordinate positions and the measured time and frequency offsets sent by the TRx G1 to G7 as data, the TRx G0 can broadcast these data to any number of receiving-mode-only master TRx A0 to A3. Hence, TRx A0 to A3, using the data and its own beat comparison to signals 1 to 7 from TRx G1 to G7, TRx A0 to A3 can compute their position using multilateration similar to GPS receivers. Hence TRx A0 to A3 may need to see four of the TRx G1-G7, similar to GPS. This is possible, since the absolute time differences can be computed and therefore algorithmically synchronized, when each of TRx G1-G7 triggered their wideband signal.

More details and aspects are mentioned in connection with the embodiments described above or below. The embodiment shown in FIG. 6 may comprise one or more optional additional features corresponding to one or more aspects mentioned in connection with the proposed concept or one or more embodiments described above (e.g., FIGS. 1 to 5) or below (e.g., FIGS. 7 to 11).

Figure 7:
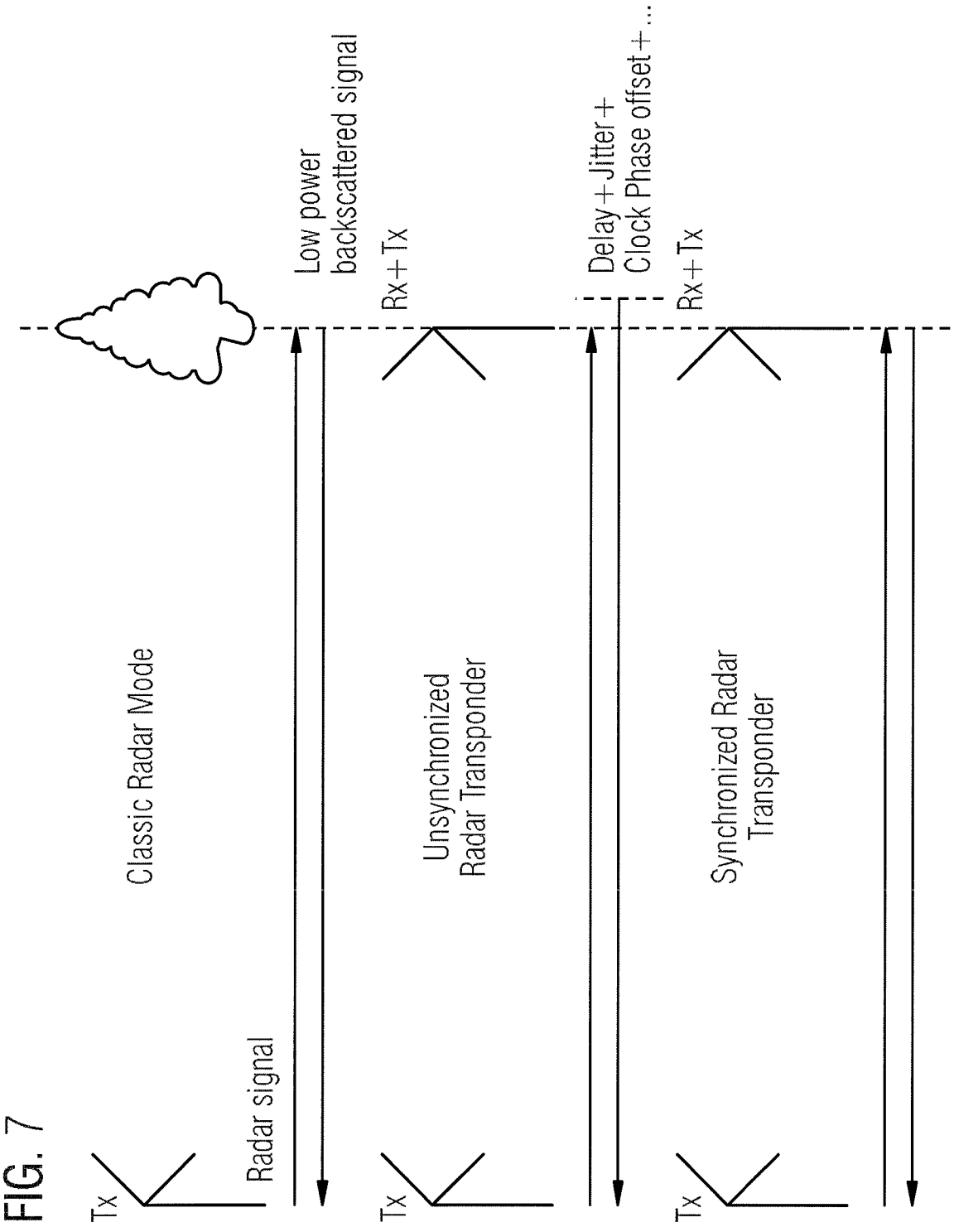
FIG. 7 schematically illustrates a scenario of a synchronized radar transponder.

FIG. 7 schematically illustrates a scenario of a synchronized radar transponder (also referred to as transceiver). In the classic radar mode, the radar signal is prone to low power backscattered signals. In the case the radar transponders are unsynchronized, the radar signal is prone to another (client hardware) delay, jitter, clock phase offset etc. In the case of synchronized radar transponders, the distance between two transceivers can be calculated accurately.

More details and aspects are mentioned in connection with the embodiments described above or below. The embodiment shown in FIG. 7 may comprise one or more optional additional features corresponding to one or more aspects mentioned in connection with the proposed concept or one or more embodiments described above (e.g., FIGS. 1 to 6) or below (e.g., FIGS. 8 to 11).

Figure 8:
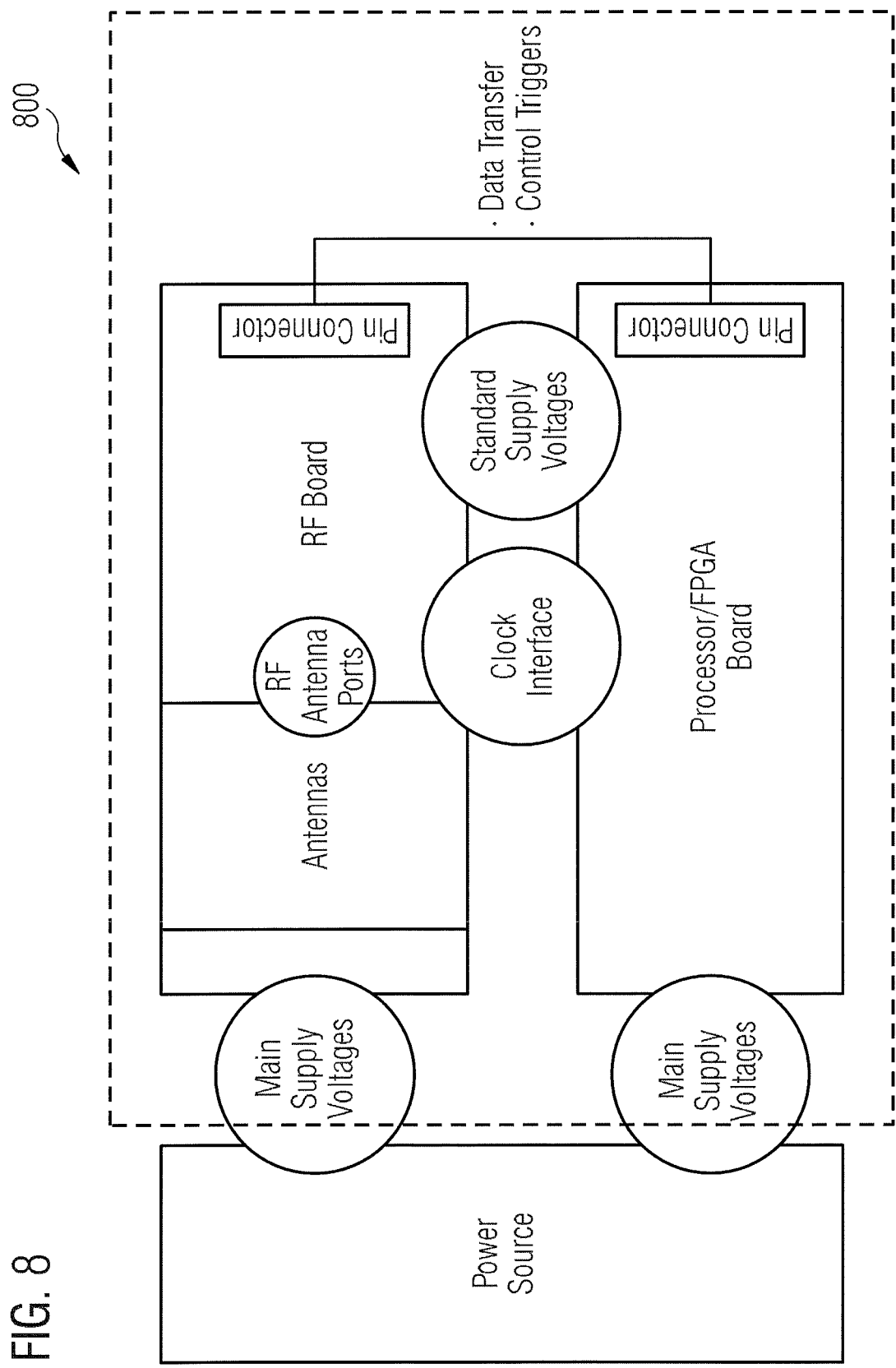
FIG. 8 schematically illustrates a radar transponder.

FIG. 8 schematically illustrates a radar transponder 800. The transponder 800 comprises a power source to provide main supply voltages for an RF Board and a Processor/FPGA Board. The Processor/FPGA Board is connected via Pin Connector(s) being the interface to the RF Board. The Processor/FPGA Board provides over this interface the data transfer and control triggers to be used for the time delays. The RF Board feeds the antennas via RF Antenna Ports in order to transmit and receive radar signals.

More details and aspects are mentioned in connection with the embodiments described above or below. The embodiment shown in FIG. 8 may comprise one or more optional additional features corresponding to one or more aspects mentioned in connection with the proposed concept or one or more embodiments described above (e.g., FIGS. 1 to 7) or below (e.g., FIGS. 9 to 11).

Figure 9:
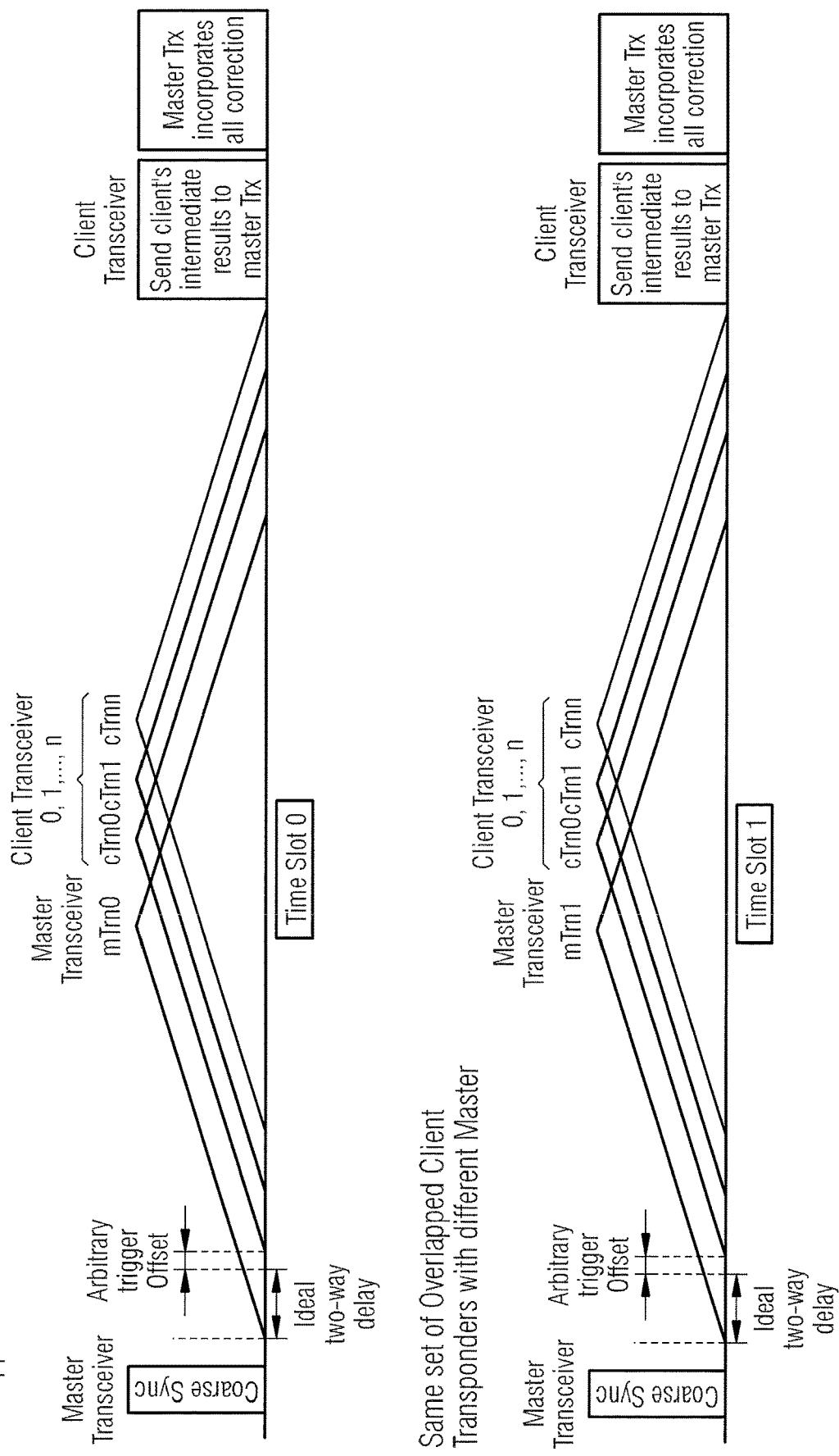
FIG. 9 schematically illustrates different client transceivers responding to a single master transceiver at different well-spaced time offsets within a time slot.

FIG. 9 schematically illustrates different client transceivers responding to a single master transceiver at different well-spaced time offsets within a time slot. This illustration shows in the upper case a first time slot and in the lower case a second time slot. The first and second time slots do not overlap. It is further shown that the different client's signals arrive at different time instances at the master in order to discriminate the signals. Further the coarse synchronization, the client's transmittal of intermediate results to the master and the incorporation of all corrections is shown in FIG. 9.

More details and aspects are mentioned in connection with the embodiments described above or below. The embodiment shown in FIG. 9 may comprise one or more optional additional features corresponding to one or more aspects mentioned in connection with the proposed concept or one or more embodiments described above (e.g., FIGS. 1 to 8) or below (e.g., FIGS. 10 to 11).

Figure 10:
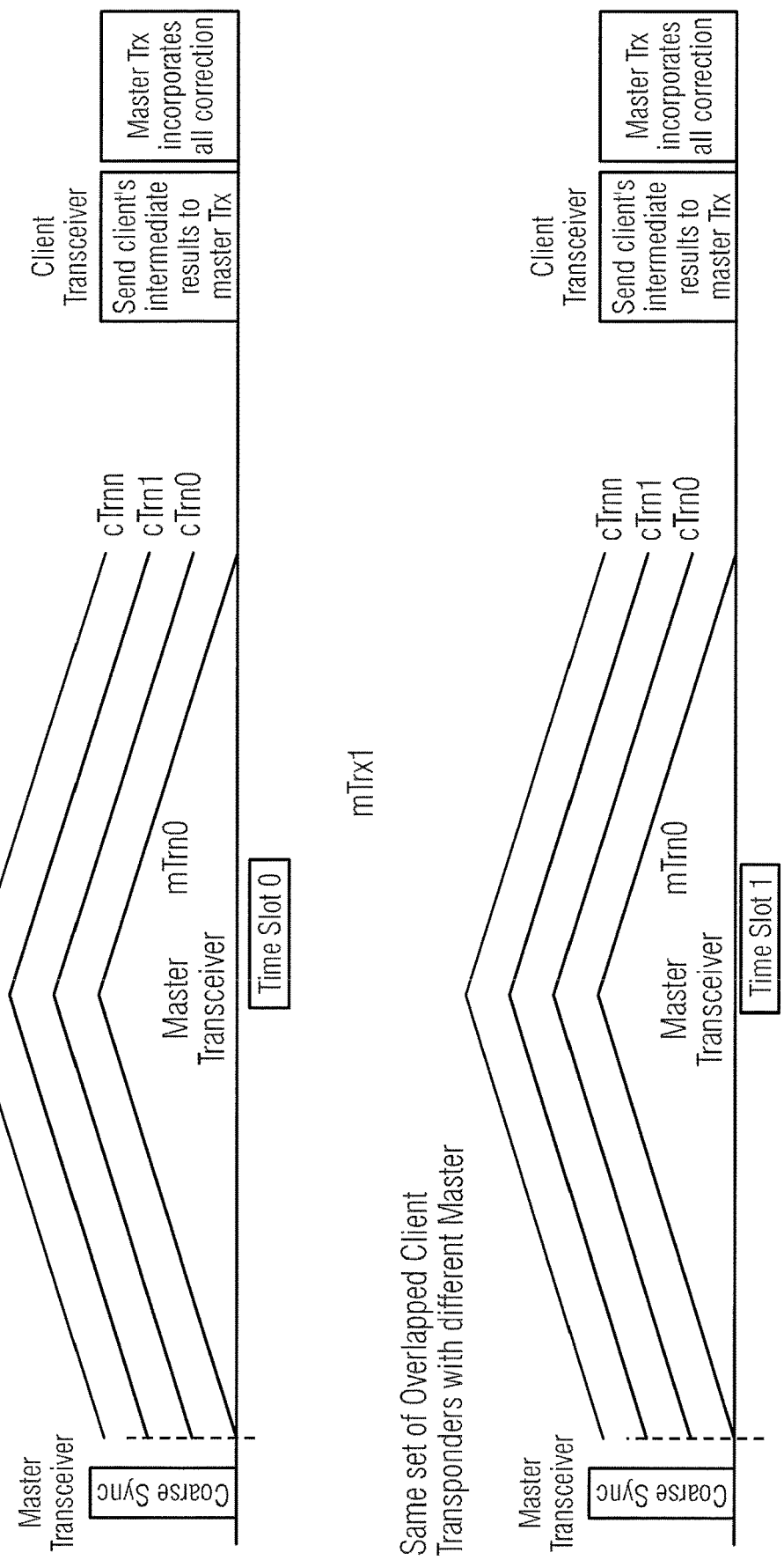
FIG. 10 schematically illustrates different client transceivers responding to a single master transceiver at different well-spaced frequency offsets within a time slot.

FIG. 10 schematically illustrates different client transceivers responding to a single master transceiver at different well-spaced frequency offsets within a time slot. Two masters are illustrated to be discriminated by transmitting and receiving during different time slots 0 (master mTrx0) and 1 (master mTrx1). Discrimination between the different clients is done by distributing the client's signals over frequency. Thus, the clients transmit signals on different frequency bands during the same time slot.

FIGS. 9 and 10 are similar or equivalent implementations of the system. These two schemes cannot be combined in the same frequency band and within the same time slot. Otherwise the beat frequency peaks cannot be correctly identified to which transceiver they belong.

The first one can be called overlapped TDMA, since the client's waveforms are overlapping in one time slot window, yet triggered at different time offsets. In pure TDMA, the waveforms do not overlap in time.

The second one can be called overlapped FDMA, since the client's waveforms are overlapping in one time slot window and yet offset at different frequencies within one frequency band. E.g. the triangular sweep band width could be 100 MHz, and the client's offset could be at 1, 2, 3, 4 MHz. So, the frequency band may be at least 104 MHz, for example 105 MHz.

Even for the overlapped FDMA, the correction equation below is valid.

Now this is for one system. It is also conceivable to have multiple of these systems working in one big space. For example, one drone to one ship is operating and a few hundred meters or less away another system of another drone to another ship is also operating. A conflict in the use of this Local Positioning System is avoided, by separating the two systems under use of a pure TDMA or pure FDMA. In pure TDMA, the respective systems operate only in a respective designated time slot. In pure FDMA, different systems can occupy different frequency bands, e.g., one at 10-10.1 GHz the other one at 10.2-10.3 GHz or a combination thereof.

More details and aspects are mentioned in connection with the embodiments described above or below. The embodiment shown in FIG. 10 may comprise one or more optional additional features corresponding to one or more aspects mentioned in connection with the proposed concept or one or more embodiments described above (e.g., FIGS. 1 to 9) or below (e.g., FIG. 11).

Figure 11:
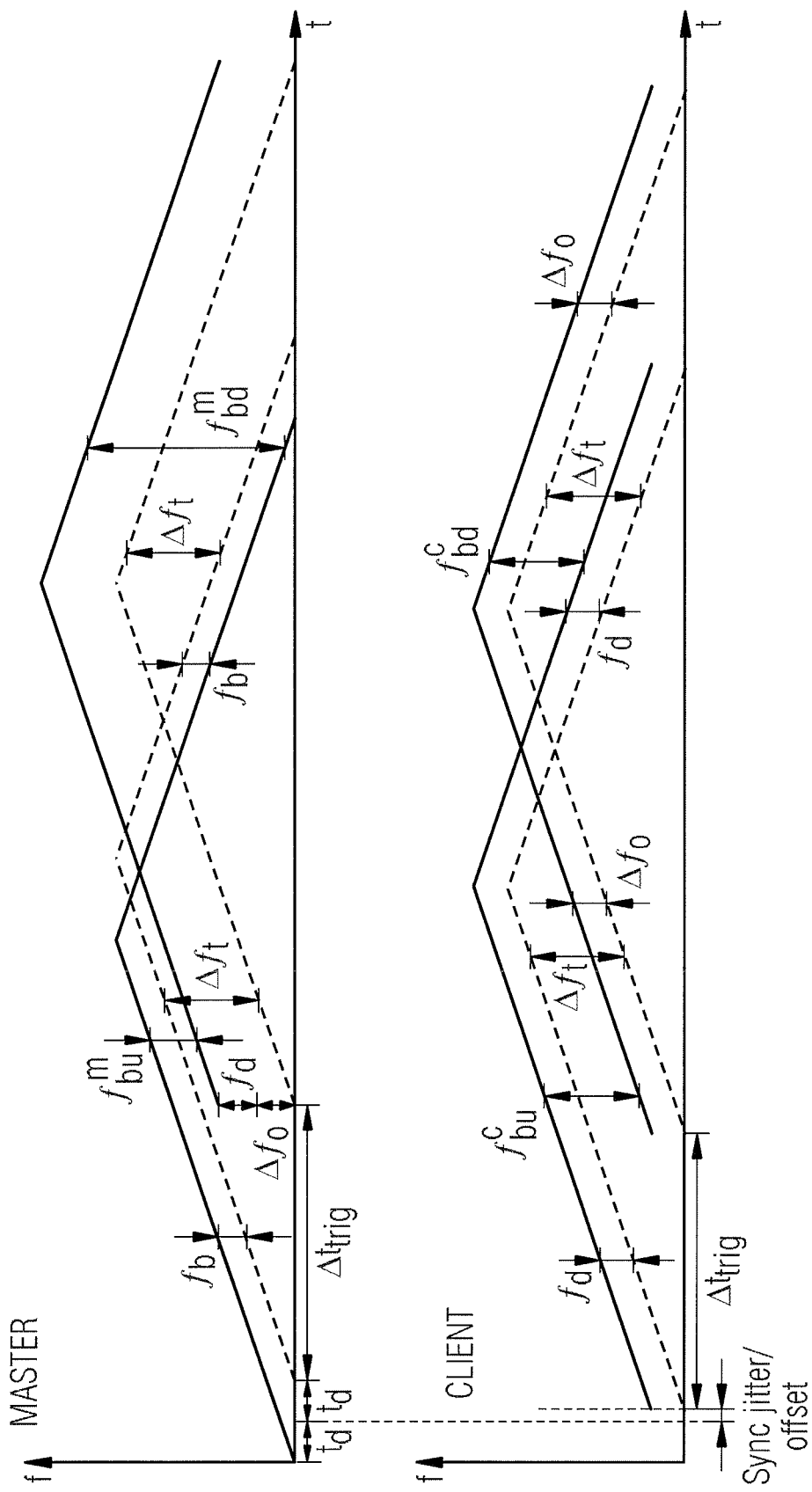
FIG. 11 schematically illustrates master and client transceiver (frequency over time) diagrams with superimposed ideal offset-less diagrams used to build a linear system of equation resulting to (correction) formulas.

FIG. 11 schematically illustrates master and client transceiver (frequency over time) diagrams with superimposed ideal offset-less diagrams used to build a linear system of equations resulting to (correction) formulas. The respective parameters and variables are shown similar to a standard FMCW radar. The following (correction) equations are used for correcting the artificial delays, the RF center frequency offset between transceivers and doppler shin (and clock frequency offset correction):

optional additional features corresponding to one or more aspects mentioned in connection with the proposed concept or one or more embodiments described above (e.g., FIGS. 1 to 10) or below.

One or more embodiments may concern Local Positioning System Synchronization using One and Two-way Artificial Delay Compensation.

One or more embodiments may provide a base measurement for LPS, with very high update rate and precision, of distance and velocity between one or more master transceiver RF station and multiple client transceiver RF stations all mounted on moving or non-moving platforms. The accuracy of the ranging distance can be narrowed down to cm level both at the very near range and far range by synchronizing the radio signal through correction of artificial and adjustable trigger delays of RF signals both at the master TRx and responding TRx stations. Ranging measurement and synchronization may be carried out at the same time using a single time slot.

An aspect may concern reducing susceptibility to be jammed.

An aspect may concern a transponder having a long pulse train from a transmitter to match and synchronize, in time and frequency, a radio signal it sends back. The synchronization may need to be done every so often depending on oscillator drifts between two transceivers.

One or more embodiment may provide a very high update rate distance ranging by carrying out the measurement and synchronization at the same time in a single pulse train even for one-master to multiple-client configuration. Multiple groups of N×M master-client transceivers can operate in the same area, enabling each group to act as independent LPS station. This may be done by overlapping the timing diagram of different system either in time or frequency similar to TDMA and FDMA. The measurement accuracy can be improved more by noting for each transceiver the total ticks of the local clock in between heartbeat sync signals sent by the master.

$f_{bu,d}^{m,c}$ = beat frequency of the detected peak at master(m) or client(c) during upsweep(u) or downsweep(d);

$f_{cNominal}$ = the nominal RF center frequency;

$t_m, B, c$ = sweep duration, RF bandwidth, speed of light;

$$f_{b,range} = \frac{(f_{bu}^m - f_{bu}^c) + (f_{bd}^m - f_{bd}^c)}{2} = \text{effective beat frequency of the range separation between master and client;}$$

$$\Delta f_o = \frac{1}{4}[(f_{bd}^m - f_{bu}^m) + (f_{bd}^c - f_{bu}^c)] = \text{the difference in frequency between the client's and master's RF oscillator;}$$

$$f_d = \frac{1}{4}[(f_{bd}^m - f_{bu}^m) - (f_{bd}^c - f_{bu}^c)] = \text{the doppler shift;}$$

$$\text{range} = \frac{ct_m}{2B} f_{b,range} = \text{the distance in meters between master and client; and}$$

$$\text{velocity} = f_d \frac{c}{f_{cNominal}} = \text{the relative radial velocity between master and client.}$$

More details and aspects are mentioned in connection with the embodiments described above or below. The embodiment shown in FIG. 11 may comprise one or more In one or more embodiments, the master transceiver may first send a bit sequence in order to do coarse synchronization at the client transceiver. The master transceiver may then send a wideband signal so the client can compare it to its own wideband signal thereby allowing a finer resolution of the synchronization in time. nTrigm and nTrigc (see FIGS. 3 to 5 and 11) may be the trigger points of the wideband signals and can be set arbitrarily. These trigger points (or time delays) may be fixed for a duration of the synchronization and measurement. For nTrigc>nTrigm, the total two-way delay may artificially be prolonged such that the client transponder signal can be distinguished from the strong backscatter of the client platform at the near range.

In one or more embodiments, the client transponder can measure mainly the delay tdc, RF frequency offset foff, and beat frequency fdc, by looking for the peak in the signal resulting from the comparison of the master and client wideband signals (see FIGS. 3 and 11). The client transponder can send those intermediate results using a data link. In the same way the master transceiver can compute for the same parameters, but the raw results may be artificial because of the arbitrary setting of the nTrigm and nTrigc. However, those trigger delays may be known beforehand hence they can be compensated.

In an aspect, simultaneous synchronization and measurement for a one-master to multiple clients system may be enabled and the client transceivers may be overlapped with offset either in time or frequency.

In an aspect, another independent set of one-master to multiple clients system is enabled by allotting the timing diagrams of the system to a different time slot.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for synchronizing transceivers, comprising:
a first plurality of transceivers, which are arranged at fixed positions with respect to each other, wherein one of the first plurality of transceivers is configured to transmit a first wideband signal; and
a second plurality of transceivers, which are arranged at fixed positions with respect to each other, wherein each of the second plurality of transceivers is configured to respectively receive the first wideband signal;

wherein each of the second plurality of transceivers is configured to generate a respective one of second wideband signals based on the respectively received first wideband signal modified by a respective one of offsets, wherein the offsets differ from each other, and wherein each of the second plurality of transceivers is configured to transmit the respective one of second wideband signals; and wherein the one of the first plurality of transceivers is configured to receive the second wideband signals which form a basis for synchronizing the one of the first plurality of transceivers with the second plurality of transceivers.

2. The system according to claim 1, wherein the offsets are arbitrarily set.

3. The system according to claim 1,
wherein, before transmitting the first wideband signal, the one of the first plurality of transceivers is configured to transmit a sync signal under use of control bits,
wherein each of the second plurality of transceivers is configured to receive the sync signal and to obtain information regarding a waveform slope and a sweep time of the first wideband signal based on the control bits, and
wherein the second wideband signals are at least partly based on the waveform slope and the sweep time.

4. The system according to claim 1, wherein the one of the first plurality of transceivers is configured to measure respective distances between each of the second plurality of transceivers and the one of the first plurality of transceivers.

5. The system according to claim 4, wherein the one of the first plurality of transceivers is configured to broadcast the measured respective distances to the other ones of the first plurality of transceivers, which are configured to compute their respective distances to each of the second plurality of transceivers based on the measured respective distances.

6. The system according to claim 1,
wherein the system further comprises a first moving vehicle,
wherein the first plurality of transceivers is mounted on the first moving vehicle, and
wherein the system further comprises a second moving vehicle,
wherein the second plurality of transceivers is mounted on the second moving vehicle.

7. The system according to claim 1,
wherein respective pairs of transceivers of the first plurality of transceivers are less than 1 meter apart, and
wherein respective pairs of transceivers of the second plurality of transceivers are more than 1 meter apart.

8. The system according to claim 1,
wherein the first plurality of transceivers is arranged to form a first area, and
wherein the second plurality of transceivers is arranged to form a second area.

9. The system according to claim 8, wherein the first area differs from the second area.

10. The system according to claim 9,
wherein the first area is a plane, and
wherein the second area is a plane.

11. The system according to claim 1, wherein, before each of the second plurality of transceivers receives the first wideband signal, the one of the first plurality of transceivers is configured to send a coarse synchronization signal, which informs each of the second plurality of transceivers that a transmittal of the first wideband signal starts.

12. The system according to claim 11,
wherein the transmittal of the first wideband signal starts after an end of the coarse synchronization signal,
wherein a first time delay exists between the end of the coarse synchronization signal and a beginning of the first wideband signal.

13. The system according to claim 12, wherein, after each of the second plurality of transceivers determined the end of the received coarse synchronization signal, each of the second plurality of transceivers is configured to start the respective one of offsets.

14. The system according to claim 13, wherein each of the second plurality of transceivers is configured to transmit information on the respective one of offsets to the one of the first plurality of transceivers via a data link, after transmitting the respective one of second wideband signals.

15. The system according to claim 14,
wherein each of the second plurality of transceivers is configured to compare the respectively received first wideband signal with a signal corresponding to the transmitted first wideband signal, which results respectively comprise a frequency offset, a beat frequency and a delay time interval between receiving the first wideband signal and transmitting the respective one of the second wideband signals,
wherein the results are transmitted via the data link to the one of the first plurality of transceivers.

* * * * *